(12) United States Patent
Allegrucci

(10) Patent No.: US 6,985,980 B1
(45) Date of Patent: Jan. 10, 2006

(54) DIAGNOSTIC SCHEME FOR PROGRAMMABLE LOGIC IN A SYSTEM ON A CHIP

(75) Inventor: Jean-Didier Allegrucci, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 511 days.

(21) Appl. No.: 09/705,487

(22) Filed: Nov. 3, 2000

(51) Int. Cl.
G06F 11/00 (2006.01)

(52) U.S. Cl. .................... 710/107; 714/30; 714/24

(58) Field of Classification Search ............ 710/100, 710/107; 714/25, 34, 30, 35; 709/200
See application file for complete search history.

(56) References Cited

U.S. PATENT DOCUMENTS

| | | | |
|---|---|---|---|
| 4,959,772 A * | 9/1990 | Smith et al. ............... | 714/48 |
| 5,047,926 A | 9/1991 | Kuo et al. | |
| 5,367,550 A | 11/1994 | Ishida | |
| 5,452,419 A * | 9/1995 | Di Giulio et al. ........... | 709/200 |
| 5,473,754 A * | 12/1995 | Folwell et al. .............. | 714/45 |
| 5,479,635 A * | 12/1995 | Kametani .................... | 711/105 |
| 5,572,667 A | 11/1996 | Ideta | |
| 5,675,729 A * | 10/1997 | Mehring ...................... | 714/37 |
| 5,710,891 A | 1/1998 | Normoyle et al. | |
| 5,717,851 A | 2/1998 | Yishay et al. | |
| 5,724,505 A | 3/1998 | Argade et al. | |
| 5,737,516 A | 4/1998 | Circello et al. | |
| 5,793,776 A * | 8/1998 | Qureshi et al. ............. | 714/724 |
| 5,812,562 A * | 9/1998 | Baeg ........................... | 714/726 |
| 5,896,415 A * | 4/1999 | Owens et al. ............... | 375/224 |
| 5,901,295 A | 5/1999 | Yazdy | |
| 5,915,083 A * | 6/1999 | Ponte .......................... | 714/30 |

(Continued)

FOREIGN PATENT DOCUMENTS

| | | | |
|---|---|---|---|
| EP | 0 636 976 A1 | | 2/1995 |
| JP | 55033257 A | * | 3/1980 |
| JP | 404333963 A | * | 11/1992 |
| JP | 06052070 A | * | 2/1994 |
| WO | WO 00/22546 | | 4/2000 |

OTHER PUBLICATIONS

Efficient Mechanism for Multiple Debug Modes, IBM Technical Disclosure Bulletin, Nov., 1995, p. 65-68, Vo. 38, No. 11, Armonk, NY, USA.

Primary Examiner—Paul R. Myers
(74) Attorney, Agent, or Firm—Blakely Sokoloff; John King

(57) ABSTRACT

A scheme for freezing the clock of a CSOC to obtain a static view of the hardware for debugging purposes. A breakpoint unit is programmed to break on specific conditions or sequence of events. The breakpoint unit monitors the bus. Upon the occurrence of the programmed event the breakpoint unit generates a clock freeze signal. The clock freeze event signal is input to the bus arbiter which causes the bus arbiter to stop granting access to the bus to any bus master except the debug port. The bus arbiter checks for pending transactions on the bus and monitors the completion of any pending transactions. This ensures that the system will not be frozen while in a wait state which would render the bus inoperable. Once all pending transactions are complete, the bus arbiter generates a qualified clock freeze signal to the CSL clock thereby freezing the system for debugging.

23 Claims, 2 Drawing Sheets

CSOC Block Diagram

U.S. PATENT DOCUMENTS

| | | |
|---|---|---|
| 6,026,501 A | 2/2000 | Hohl et al. |
| 6,134,652 A | 10/2000 | Warren |
| 6,331,957 B1 | 12/2001 | Kurts et al. |
| 6,356,960 B1 * | 3/2002 | Jones et al. .................... 710/5 |
| 6,425,101 B1 | 7/2002 | Garreau |
| 6,430,727 B1 | 8/2002 | Warren |
| 6,598,178 B1 | 7/2003 | Yee et al. |
| 6,665,817 B1 * | 12/2003 | Rieken ........................ 714/30 |
| 6,728,906 B1 * | 4/2004 | Case et al. .................... 714/45 |
| 6,757,846 B1 * | 6/2004 | Murray et al. ................ 714/34 |

\* cited by examiner

DIAGNOSTIC SCHEME FOR PROGRAMMABLE LOGIC IN A SYSTEM ON A CHIP

FIELD OF THE INVENTION

The present invention relates generally to diagnostic methods for programmable logic, and more specifically to accessing programmable logic in a system on a chip bus-based system.

BACKGROUND

A recent development in micro-electronics is the configurable system on a chip (CSOC). The system integrates a CPU, an internal system bus, and programmable logic, also referred to as configurable system logic (CSL). The various system resources are all interconnected, and communicating through an internal system bus, on a single piece of silicon. The internal system bus signals and various dedicated system resource signals that connect to the CSL are collectively referred to as the configurable system interconnect or CSI. There are two types of pins, dedicated pins to interface with external devices (e.g., external memory) and programmable pins that can serve as an interface to other user logic. The dedicated processor bus and system resources provide an efficient and stable high performance system, while the configurable system logic provides flexibility for the user to implement additional functions. There are many benefits to embedding the programmable logic, including time-to-market, integration, and flexibility. The downside of embedding the programmable logic is that the signals are not directly accessible (i.e., observable and controllable) by the engineer charged with system debugging. Many of the signals that are of considerable interest when debugging a system are now buried inside the device. As a result, system debugging and trouble-shooting capability can be severely limited.

SUMMARY OF THE INVENTION

A method is described for diagnosing programmable hardware in a programmable logic system. The method comprises ceasing bus access upon the occurrence of a specified event or sequence of events while allowing the completion of all pending transactions. When all pending transactions are completed the system clock is stopped such that the state of the programmable hardware is held static. The static state of the hardware is then accessed through a debug port. An apparatus and a machine readable medium that implement the method are also described.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An embodiment of the present invention will provide a more efficient method of debugging user-implemented hardware in a configurable system on a chip. An embodiment of the invention allows the user to freeze the clock upon the occurrence of a user-specified event while avoiding the possibility that the clock will be frozen in a wait state. In one embodiment of the present invention the breakpoint unit of the system is programmable and will issue a clock freeze event upon the occurrence of a programmed event or sequence of events. The bus arbiter will cease granting bus access at this time, but will allow all pending transactions to be completed. The system can be stopped and the state of the system at a particular point can be viewed for debugging purposes. This method provides the user with a "snapshot" of the system at a desired time.

An intended advantage of one embodiment of the invention is to provide the user with the state of the system at a given time for debugging purposes. Another intended advantage of one embodiment of the invention is to ensure that the system is not currently in a wait state when the system clock is stopped. This allows the bus to be used by the debugging port.

Figure 1:
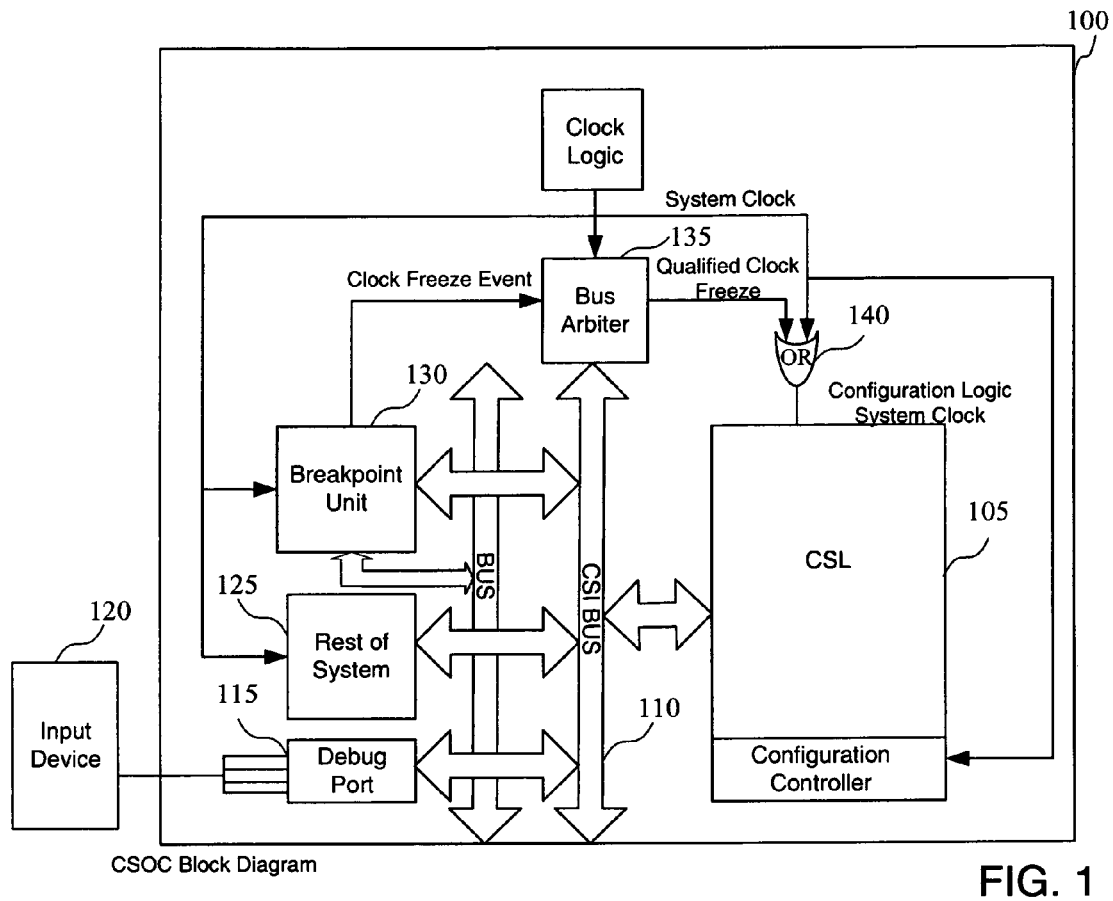
FIG. 1 is a block diagram of a configurable system on a chip.

FIG. 1 is a block diagram of a configurable system on a chip. The system 100 shown in FIG. 1 includes those portions of a CSOC relevant to an embodiment of the present invention, although a variety of different computing systems can implement the present invention. The system 100 shown in FIG. 1 includes a configurable system logic 105, which is coupled to the rest of the system through the configurable system interconnect 110 CSI. The rest of the system 125 includes the CPU, DMA, peripherals, counters, timers, memory, and memory interfaces. The system includes a debug joint test action group (JTAG) port 115 that is connected to a user input device 120 that is external to the chip, for example, a computer. The debug JTAG port 115 is a busmaster on the CSI bus 110 and therefore has access to any resources connected to the CSI bus 110. This includes the breakpoint unit 130, so that the user can program the breakpoint unit 130 through the JTAG port 115. In one embodiment the breakpoint unit 130 connects to, and allows tracing of, multiple buses and includes the ability to break on the occurrence of a predetermined bus event on any one of the multiple buses. In one embodiment the breakpoint unit 130 may be connected to, and programmed by, a host debugging system via a port on the target chip.

The breakpoint unit monitors the CSI bus 110. The user programs the breakpoint unit 130 to break on a specific condition or sequence of events. The breakpoint unit 130 may be configured to generate one or more output signals upon a breakpoint event. The output signals may be used to interrupt of freeze a processor, depending on the processor's supported features. So, for example, the user may program the breakpoint unit 130 to break as soon as there is a write to a specific register address. As soon as that happens, the breakpoint unit 130 generates a breakpoint event (e.g., the breakpoint unit 130 generates a clock freeze cycle). The clock freeze signal is propagated to the system clock. However, due to the pipeline nature of the bus, there may be pending operations from the bus that are being executed. For example, before the write signal that triggered the breakpoint there may have been a read that was being executed. That read may be to an external memory device that takes several cycles to execute and may, therefore, be in a wait state. There could be many other examples of accessing something in the configurable system logic that might have generated a wait state prior to the breakpoint event. All of these transactions must be terminated prior to freezing the clock. If the transactions were not completed the system might be frozen while in a wait state, which would render the CSI bus 110 inoperable. The bus arbiter 135 is monitoring the CSI bus 110. In one embodiment the bus arbiter 135 is a state machine that implements a round-robin arbitration algorithm. One function of the bus arbiter 135 is to receive access requests from the several bus masters and grant access to a particular bus master after each clock cycle based on the arbitration algorithm. Another function of the bus arbiter 135 is to keep track of all transactions on the CSI bus 110 for debugging purposes. When the bus arbiter 135 receives a clock freeze signal from the breakpoint unit 130, the bus arbiter 135 stops granting access on the CSI bus 110. The bus arbiter 135 then waits for pending transactions to be completed and then allows the clock to be frozen, because only at this point can it be guaranteed that there won't be any wait states generated and that's because there are no more transactions pending on the bus.

Figure 2:
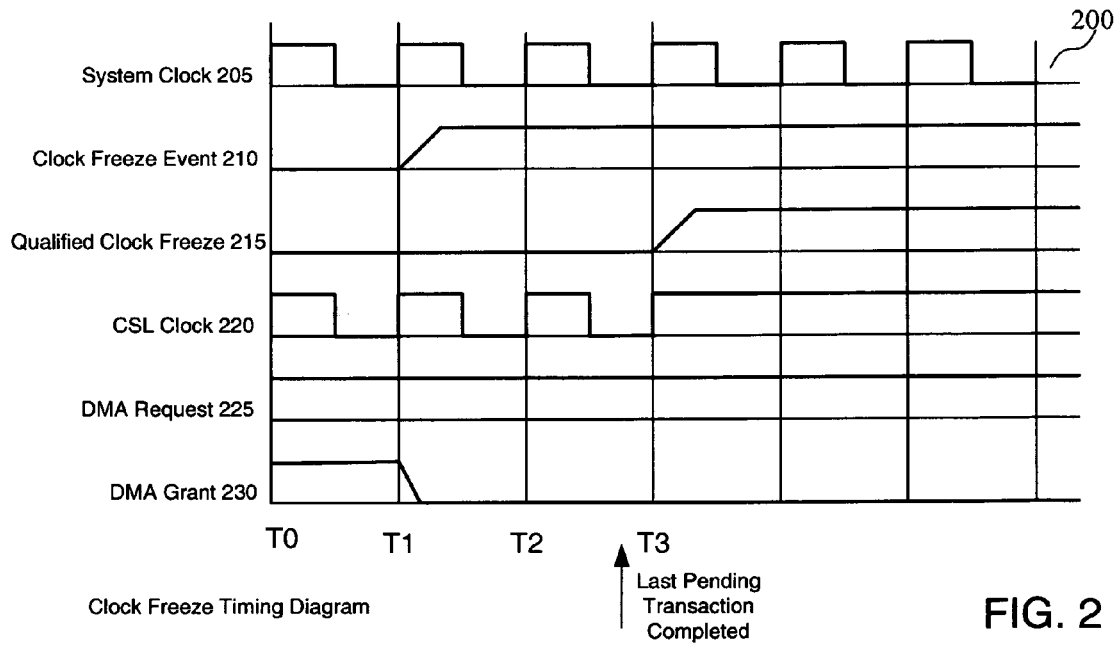
FIG. 2 is a timing diagram for the clock freeze operation.

FIG. 2 is an example of a timing diagram for the clock freeze operation discussed above in reference to FIG. 1. At $T_0$ FIG. 2 is an example of a waveform diagram for the clock freeze operation discussed above in reference to FIG. 1. The system clock 205 is functioning, the CSL clock 220 is functioning and therefore any requests, for example a DMA bus request 225, is granted. The DMA grant signal 230 is high, indicating that requests, for example DMA request 225, are being granted. At some time, T1, a clock freeze event occurs and the clock freeze event 210 goes high. At this point the arbiter stops granting any requests. The DMA grant line 230 goes low, indicating that no CSI requests will be granted. However, the qualified clock freeze signal 215 remains low, and remains low until some time, T3, where the last pending transaction is completed. The bus arbiter is aware of the last pending transaction completion. When the last pending transaction is complete the bus arbiter transmits the qualified clock freeze signal, and qualified clock freeze 215 goes high. The qualified clock freeze signal freezes the CSL clock as indicated by CSL clock signal 220 which stays high during the debugging process.

Figure 3:
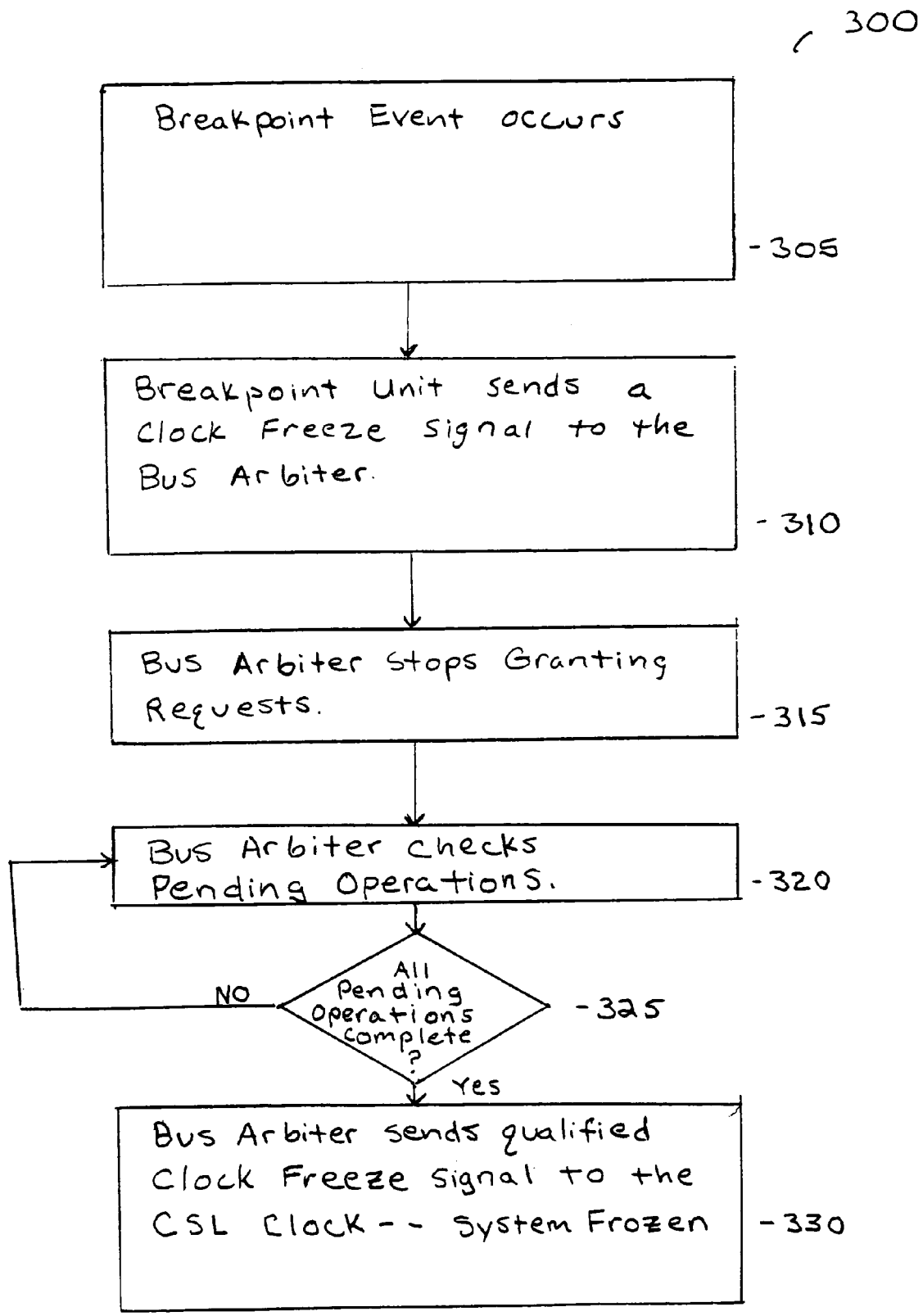
FIG. 3 is flow chart of the clock freezing process of an embodiment of the present invention.

FIG. 3 describes the process by which the clock is frozen accordance with one embodiment of the present invention. Process 300 shown in FIG. 3 begins at operation 305 in which a breakpoint event occurs. The breakpoint unit has been programmed by the user to break on specific conditions or sequences of events. At operation 310, the breakpoint unit sends a clock freeze signal to the bus arbiter. The bus arbiter then stops granting requests for the bus at operation 315. At operation 320, the bus arbiter checks for any pending operations on the bus. If there are pending operations on the bus, the bus arbiter checks to see if they are complete in operation 325. If they are not complete, the arbiter continues to monitor. If the arbiter finds that they are complete in operation 330, the arbiter then sends the qualified clock freeze signal to the CSL clock and the system is frozen. At this point, because there are no further transactions pending, there will be no wait state generated. Therefore the problem of freezing the system in a wait state is avoided. The user may now access the system from the bus and continue with debugging through the JTAG debugging port.

The process of the present invention may be implemented through use of a machine-readable medium that includes any mechanism that provides (i.e. stores and/or transmits information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for diagnosing programmable hardware comprising:
   implementing logic functions in the programmable hardware;
   detecting signals generated by the programmable hardware;
   recognizing an occurrence of a user-specified event generated by the programmable hardware;
   generating a signal to cease bus access, in a configurable system on a chip, upon the occurrence of the user specified event, the configurable system on a chip integrating at least a central processing unit, an internal system bus, and the programmable hardware, the signal generated by a breakpoint unit connected to the internal system bus, such that the user-specified event of the breakpoint unit can be programmed through a debug port;
   allowing completion of all pending bus transactions;
   stopping the system clock such that the state of the programmable hardware is held in a static state; and
   accessing the static state of the programmable hardware through the debug port.

2. The method of claim 1, wherein the internal system bus is a pipeline bus.

3. The method of claim 1, wherein the debug port is a bus master.

4. The method of claim 1, wherein allowing completion of all pending bus transactions includes monitoring the bus for pending bus transactions.

5. The method of claim 4, wherein allowing completion of all pending bus transactions further includes generating a qualified clock freeze cycle upon completion of all pending bus transactions.

6. The method of claim 1, wherein the user-specified event is programmed by a user.

7. The method of claim 6 wherein the user-specified event comprises a sequence of events.

8. The method of claim 1 wherein the breakpoint unit is connected to a plurality of buses such that the breakpoint unit generates a signal in response to a user-specified event on any of the plurality of buses.

9. The method of claim 8 wherein the breakpoint unit is programmed to generate multiple signals upon the occurrence of a user-specified event.

10. A machine-readable medium that provides executable instructions, which when executed by a processor, cause said processor to perform a method for diagnosing programmable hardware comprising:
    implementing logic functions in the programmable hardware;
    detecting signals generated by the programmable hardware:
    recognizing an occurrence of a user-specified event generated by the programmable hardware;

generating a signal to cease bus access, in a configurable system on a chip, upon the occurrence of the user-specified event, the configurable system on a chip integrating at least a central processing unit, an internal system bus, and the programmable hardware, the signal generated by a breakpoint unit connected to the internal system bus, such that the user-specified event of the breakpoint unit can be programmed through a debug port;

allowing completion of all pending bus transactions;

stopping the system clock such that the state of the programmable hardware is held in a static state; and accessing the static state of the programmable hardware through the debug port.

11. The machine-readable medium of claim 10, wherein the internal system bus is a pipeline bus.

12. The machine-readable medium of claim 10, wherein the debug port is a bus master.

13. The machine-readable medium of claim 10, wherein allowing completion of all pending bus transactions includes monitoring the bus for pending bus transactions.

14. The machine-readable medium of claim 13, wherein allowing completion of all pending bus transactions further includes generating a qualified clock freeze cycle upon completion of all pending bus transactions.

15. The machine-readable medium of claim 10, wherein the user-specified event is programmed by a user.

16. An apparatus for diagnosing programmable hardware comprising:

means to implement logic functions in the programmable hardware;

means to detect signals generated by the programmable hardware;

means to recognize an occurrence of a user-specified event generated by the programmable hardware;

a breakpoint unit to generate a signal to cease bus access, in a configurable system on a chip, upon the occurrence of the user-specified event, the configurable system on a chip integrating at least a central processing unit, an internal system bus, and logic the programmable hardware, the breakpoint unit connected to the internal system bus, such that the user-specified event of the breakpoint unit can be programmed through a debug port;

means to allow completion of all pending bus transactions;

means to stop the system clock such that the state of the programmable hardware is held in a static state; and means to access the static state of the programmable hardware through the debug port.

17. The apparatus of claim 16, wherein the internal system bus is a pipeline bus.

18. The apparatus of claim 16, wherein the debug port is a bus master.

19. The apparatus of claim 16, wherein allowing completion of all pending bus transactions includes monitoring the bus for pending bus transactions.

20. The machine-readable medium of claim 19 wherein the user-specified event comprises a sequence of events.

21. The apparatus of claim 19, wherein allowing completion of all pending bus transactions further includes generating a qualified clock freeze cycle upon completion of all pending bus transactions.

22. The apparatus of claim 16, wherein the user-specified event is programmed by a user.

23. The apparatus of claim 22 wherein the user-specified event comprises a sequence of events.

\* \* \* \* \*